(12) United States Patent
Egawa

(10) Patent No.: US 7,390,277 B2
(45) Date of Patent: Jun. 24, 2008

(54) REDUCER WITH INTERNALLY MESHING PLANETARY GEAR MECHANISM AND DEVICE INCORPORATING THE REDUCER

(75) Inventor: Masanori Egawa, Chiryu (JP)

(73) Assignee: Nokia Corporation, Espoo (FI)

( * ) Notice: Subject to any disclaimer, the term of this patent is extended or adjusted under 35 U.S.C. 154(b) by 111 days.

(21) Appl. No.: 11/185,895

(22) Filed: Jul. 21, 2005

(65) Prior Publication Data

US 2006/0025271 A1 Feb. 2, 2006

(30) Foreign Application Priority Data

Jul. 27, 2004 (JP) .............................. 2004-219209

(51) Int. Cl.
*F16H 57/04* (2006.01)
(52) U.S. Cl. .......................... 475/159; 475/162; 475/179
(58) Field of Classification Search ................. 475/159, 475/160, 162, 163, 179
See application file for complete search history.

(56) References Cited

U.S. PATENT DOCUMENTS

| | | | | |
|---|---|---|---|---|
| 4,307,630 A | * | 12/1981 | Osborn et al. | 475/159 |
| 6,679,801 B2 | * | 1/2004 | Nohara et al. | 475/179 |
| 7,147,582 B2 | * | 12/2006 | Mingishi et al. | 475/163 |
| 2002/0155915 A1 | * | 10/2002 | Tanaka | 475/162 |

FOREIGN PATENT DOCUMENTS

JP          2001-187945          7/2001

* cited by examiner

*Primary Examiner*—Sherry Estremsky
(74) *Attorney, Agent, or Firm*—Squire, Sanders & Dempsey L.L.P.

(57) ABSTRACT

The device includes a cover coupled to a first flange on the opposite side from an internally meshing planetary reduction gear part. The cover has a hole through which the input shaft of the reduction gear extends. An oil reservoir section is formed between the cover and the first flange. Oil seals are provided between the input shaft and the cover, and between the input shaft and a second flange, respectively.

5 Claims, 6 Drawing Sheets

REDUCER WITH INTERNALLY MESHING PLANETARY GEAR MECHANISM AND DEVICE INCORPORATING THE REDUCER

BACKGROUND OF THE INVENTION

1. Field of the Invention

The present invention relates to a reducer with an internally meshing planetary gear mechanism and a device incorporating the reducer used for driving a machine in a high-precision control system, such as a joint controller of industrial robots, an automatic tool exchanger, and the like.

2. Description of the Related Art

FIG. 6 shows one example of a conventional reducer with an internally meshing planetary gear mechanism (hereinafter simply referred to as "reducer") 10 used for driving a machine in a high-precision control system, such as a joint controller of industrial robots or an automatic tool exchanger (Japanese Patent Laid-Open Publication No. 2001-187945). The reducer 10 is provided with a first flange 14A and a second flange 14B, and an internally meshing planetary reduction gear part (hereinafter simply referred to as "reduction gear part") GS0. The first and second flanges 14A and 14B are disposed opposite each other inside a casing 12 and supported rotatably in the casing 12. The reduction gear part GS0 is disposed between the first and second flanges 14A and 14B. An input shaft 16 of the reduction gear part GS0 is supported rotatably on respective sides by the first and second flanges 14A and 14B.

The first and second flanges 14A and 14B of this reducer 10 are integrally and securely coupled to each other by a plurality of carrier bolts 18 and are rotatable relative to the casing 12.

The input shaft 16 of the reduction gear part GS0 is supported by the first and second flanges 14A and 14B via a pair of bearings 20A and 20B so that it is rotatable relative to the first and second flanges 14A and 14B. The input shaft 16 in this conventional example is a hollow shaft having a bore. On the outer surface of the input shaft 16 between bearings 20A and 20B are integrally formed eccentric bodies 22A, 22B, and 22C, which are offset from each other by a certain phase difference. Three external gears 26A, 26B, and 26C are respectively mounted around the eccentric bodies 22A, 22B, and 22C via roller bearings 24A, 24B, and 24C so that they can oscillatingly rotate. The three external gears 26A, 26B, and 26C mesh with an internal gear 28 that is integral with the casing 12. The teeth of the internal gear 28 are composed of roller-like pins (outer pins) 30.

Inner pin holes 32A, 32B, and 32C are bored in the three external gears 26A, 26B, and 26C respectively, and a tubular inner roller 34 extends through the holes 32A, 32B, and 32C. An inner pin 36 is inserted in this inner roller 34. The inner pin 36 is supported on respective sides by the first and second flanges 14A and 14B, so that drive power input to the input shaft 16 of the reduction gear part GS0 is transmittable to the outside with reduced speed through the first and second flanges 14A and 14B.

Although not shown, grease is provided in the reduction gear part GS0, and to prevent grease leakage, seals 38A and 38B are arranged inside the bearings 20A and 20B. Further, oil seals 40A and 40B are arranged between the casing 12 and the first and second flanges 14A and 14B, respectively.

While the conventional reducer 10 is lubricated with grease, oil lubrication would be preferable in respect of higher fluidity than grease, high seizure load, and easy and low-cost maintenance.

Contrary to the assumption that grease may simply be replaced by oil, however, the conventional reducer 10 with oil lubrication failed to achieve desired performance and product life.

Another problem was that the sealing structure for the grease lubrication system could not be used as it is for an oil lubrication system because of the difference in viscosity.

SUMMARY OF THE INVENTION

In view of the above problems in the conventional techniques, various exemplary embodiments of the present invention provide a reducer with an internally meshing planetary gear mechanism and a device incorporating the reducer with a better lubrication system for longer life and higher efficiency. The grease lubrication system of conventional planetary gear reducers is replaced by an oil lubrication system with only minor changes in design and the reducer and the device incorporating the reducer of the invention can share many parts and components with conventional reducers with internally meshing planetary gears.

To achieve the above object, the present invention provides a reducer with an internally meshing planetary gear mechanism, comprising a first flange and a second flange arranged opposite each other inside a casing and rotatably supported in the casing, an internally meshing planetary reduction gear part arranged between the first and second flanges and having an input shaft that is supported rotatably on respective sides by the first and second flanges, and a cover, through which the input shaft extends, arranged on the first flange on the opposite side from the internally meshing planetary reduction gear part. An oil reservoir section is formed between the cover and the first flange. Oil seals are provided between the input shaft and the cover and between the input shaft and the second flange, respectively.

This reducer with an internally meshing planetary gear mechanism according to the present invention can share many parts and components with conventional planetary gear reducers and adopt an oil lubrication system with only minor changes in design, and the improved lubrication provides longer life and higher efficiency.

The first flange may be formed with an oil circulating hole in addition to a hole for the input shaft of the first flange so that the oil reservoir section communicates with the internally meshing planetary reduction gear part. This enables smoother circulation of the lubricating oil between the oil reservoir section and the internally meshing planetary reduction gear part and will further enhance the lubricating effect.

The cover may be formed with an oil port which connects the oil reservoir section with the outside of the cover. This enables easy maintenance, as the lubricating oil can be exchanged without having to disassembling the entire reducer.

The cover may have another function in a device in which the reducer with an internally meshing planetary gear mechanism is incorporated. For example, the cover may have a function of cover of a motor connected to the reducer, or of cover of a brake connected to the reducer.

The reducer with an internally meshing planetary gear mechanism and the device incorporating the reducer of the present invention can share many parts and components with conventional planetary gear reducers and adopt an oil lubrication system with only minor changes in design, and the improved lubrication provides longer life and higher efficiency.

DETAILED DESCRIPTION OF PREFERRED EMBODIMENTS

Preferred exemplary embodiments of the device incorporating a reducer with an internally meshing planetary gear mechanism of the invention will be hereinafter described with reference to the drawings.

Figure 1:
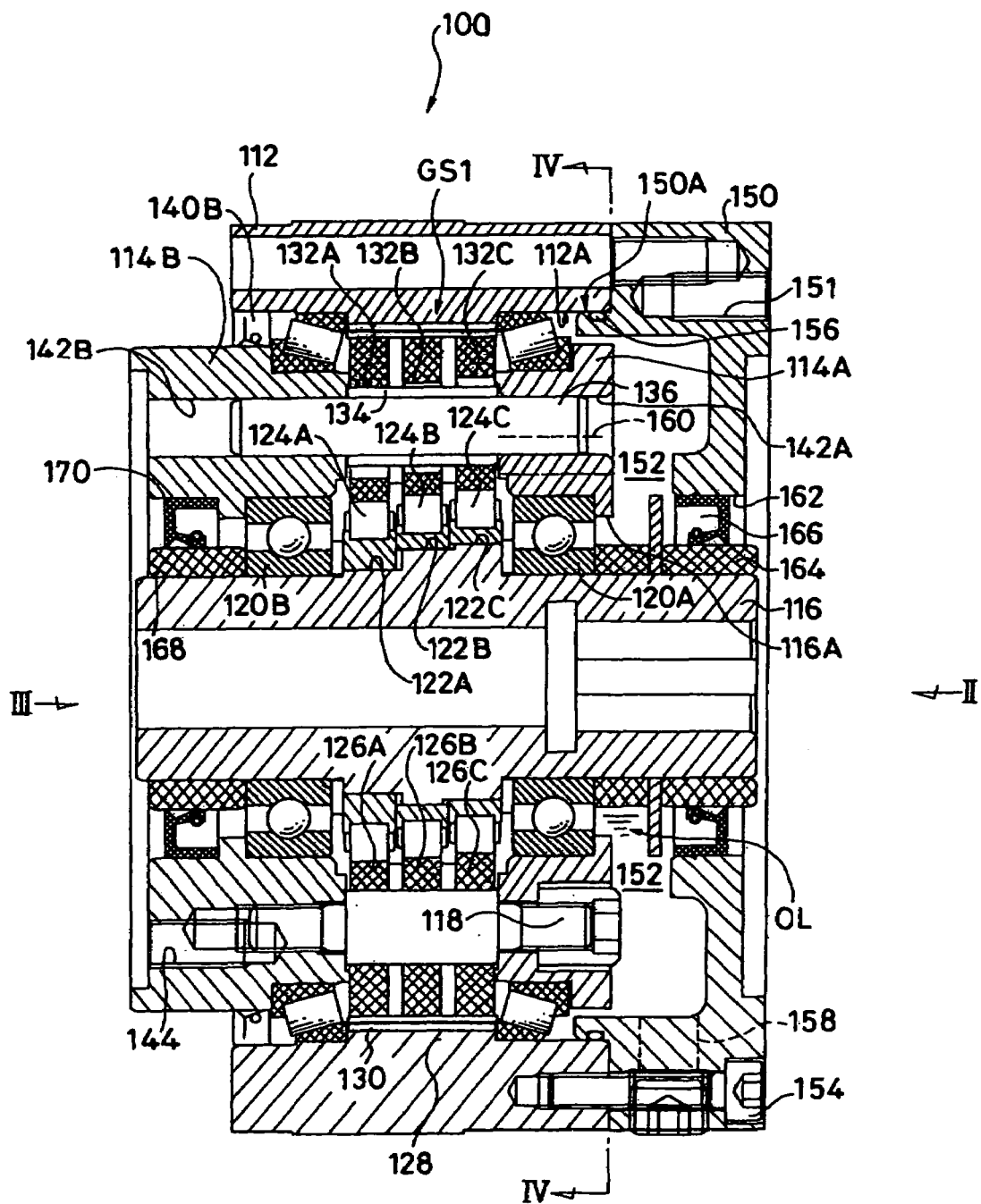
FIG. 1 is a cross-sectional view showing a device incorporating a reducer with internally meshing planetary gears according to one exemplary embodiment of the present invention.
Figure 2:
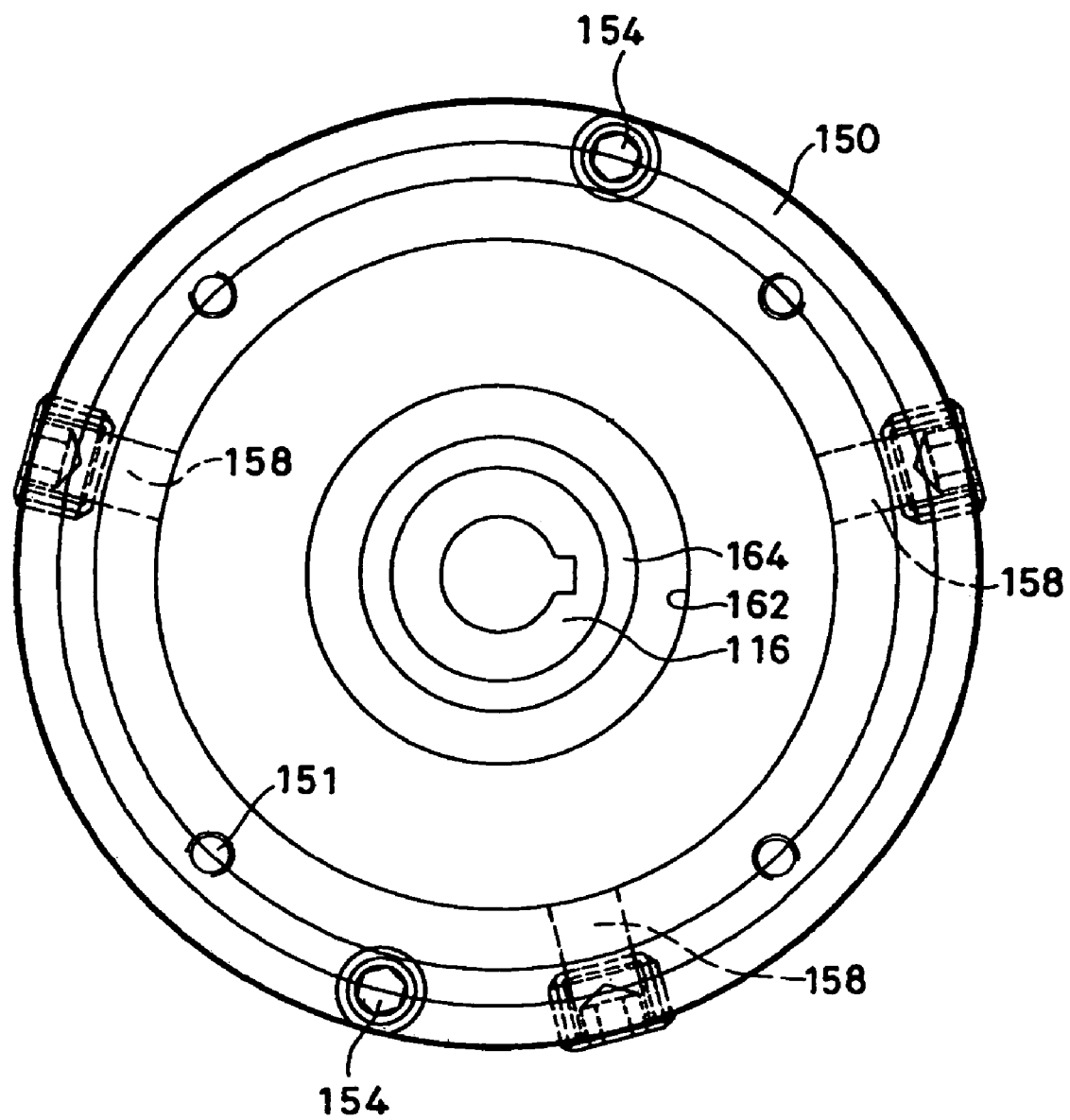
FIG. 2 is a side view taken from the direction of the arrow II in FIG. 1.
Figure 3:
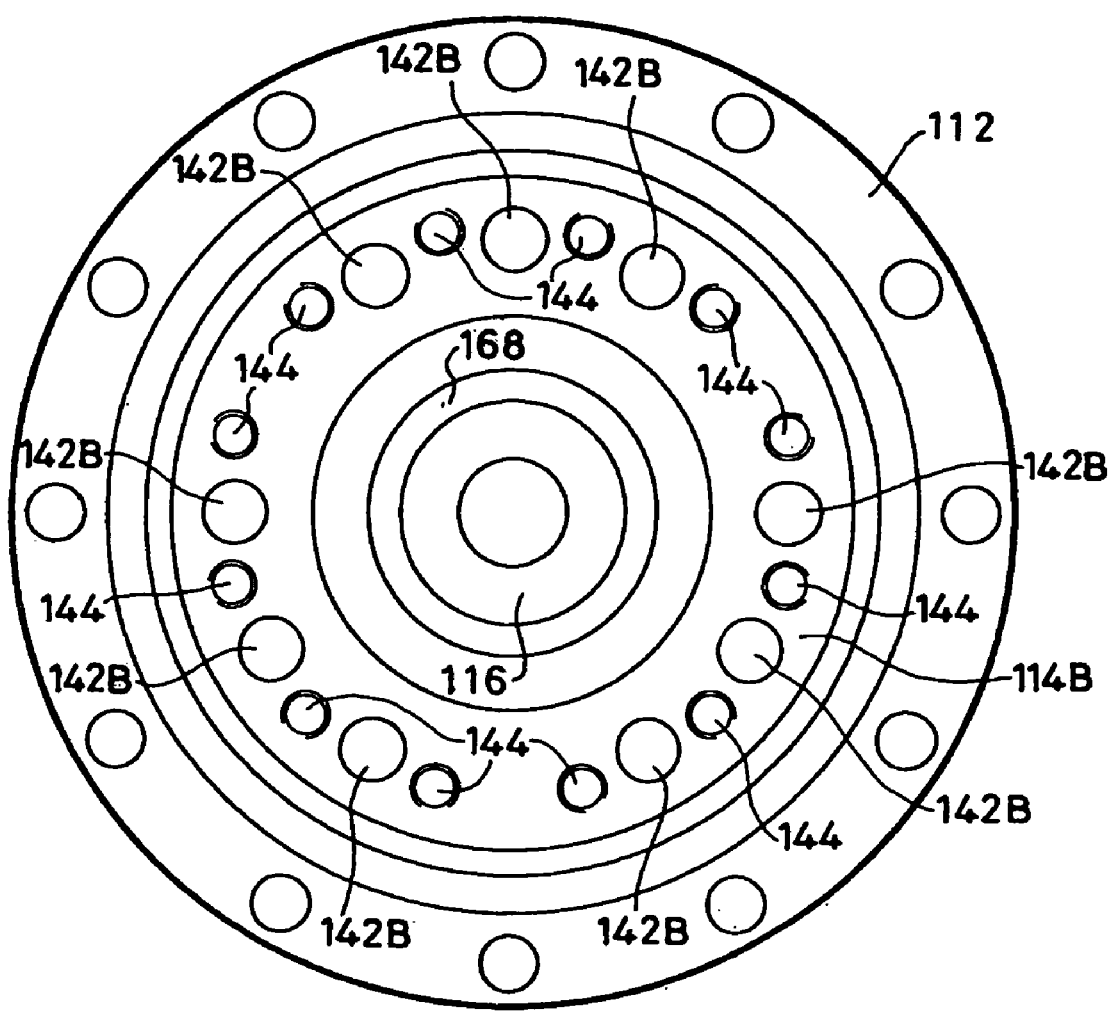
FIG. 3 is a side view taken from the direction of the arrow III in FIG. 1.
Figure 4:
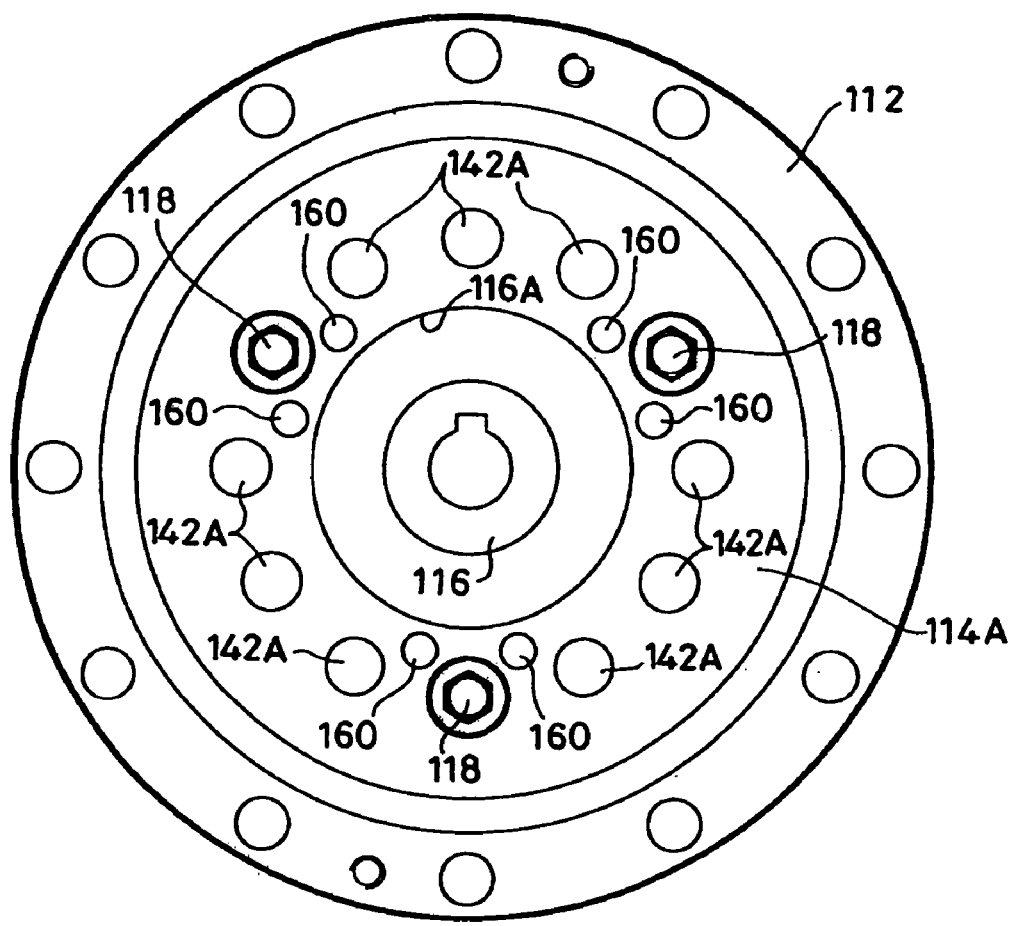
FIG. 4 is a cross-sectional view taken along the line IV-IV in FIG. 1.

FIG. 1 is a cross-sectional view showing one exemplary embodiment of a device having a reducer with an internally meshing planetary gear mechanism (hereinafter simply referred to as "reducer device") 100. FIG. 2 and FIG. 3 are side views taken from the directions of the arrows II and III in FIG. 1, respectively. FIG. 4 is a cross-sectional view taken along the line IV-IV in FIG. 1.

This reducer device 100 comprises a first flange 114A and a second flange 114B, and an internally meshing planetary reduction gear part (hereinafter simply referred to as "reduction gear part") GS1. The first and second flanges 114A and 114B are disposed opposite each other inside a casing 112 and supported rotatably in the casing 112. The reduction gear part GS1 is disposed between the first and second flanges 114A and 114B. An input shaft 116 of the reduction gear part GS1 is supported rotatably on respective sides by the first and second flanges 114A and 114B. In this configuration, lubricating oil OL is used in this reducer device 100 instead of the grease in the above-described conventional reducer 10.

Parts or elements of the reducer device 100 that are the same as or similar to those of the conventional reducer 10 are given reference numerals with the same last two digits in the drawings, and the description thereof will be omitted. Below, the oil lubrication structure, which is the characteristic feature of the invention, will be described in detail.

The reducer device 100 includes a tray-like motor coupling cover 150 in which a motor (not shown) is mounted.

The motor coupling cover 150 is disposed on the first flange 114A on the opposite side from the reduction gear part GS1. Between the cover 150 and the flange 114A is formed an oil reservoir section 152 in which lubricating oil OL is reserved. The motor coupling cover 150 is securely coupled to the casing 112 with bolts 154. An O-ring 156 is provided between the inner circumferential surface 112A of the casing 112 and the outer circumferential surface 150A of the cover 150 contacting the inner surface 112A of the casing 112.

The oil reservoir section 152 communicates with the outside of the motor coupling cover 150 through a plurality of (three in this example) oil ports 158 provided in the peripheral frame part of the cover 150, as shown in FIG. 2. In the side face of the cover 150 are formed a plurality of (four in this example) taps 151 along the axial direction.

Referring back to FIG. 1, the motor coupling cover 150 includes a hole 162 in the center, through which the input shaft 116 can extend. A tubular collar 164 is fitted on the input shaft 116, and an oil seal 166 is provided between the hole 162 and the input shaft 116 via the collar 164. Between the second flange 114B and the input shaft 116 is also provided an oil seal 170, via a collar 168 fitted on the input shaft 116.

As shown in FIG. 4, a plurality of (six in this example) oil circulating holes 160 are arranged circumferentially aside from an input shaft bore 116A of the first flange 114A, so that the oil reservoir section 152 communicates with the inside of the reduction gear part GS1. The lubricating oil OL held in the oil reservoir section 152 can travel through these oil circulating holes 160 between the oil reservoir section 152 and the inside of the reduction gear part GS1.

Next, the operation of this reducer device 100 is described.

The eccentric bodies 122A, 122B, and 122C integral with the input shaft 116 of the reduction gear part GS1 rotate with the input shaft 116, and this rotation of the eccentric bodies 122A, 122B, and 122C causes the external gears 126A, 126B, and 126C to oscillatingly rotate around the input shaft 116. However, since the external gears 126A, 126B, and 126C are restrained from rotating by the internal gear 128, they almost only oscillate with internally meshing with the internal gear 128. The oscillating components of the external gears 126A, 126B, and 126C are absorbed by clearances between the inner rollers 134 and the inner pin holes 132A, 132B, and 132C, and only rotational components of the external gears around their axes are transmitted to the first and second flanges 114A and 114B through the inner pins 136.

This reducer device 100 according to the present exemplary embodiment comprises a motor coupling cover 150 covering the opposite side from the reduction gear part GS1 of the first flange 114A, and having a hole for the input shaft 116 to extend through. An oil reservoir section 152 for holding lubricating oil OL is formed between the motor coupling cover 150 and the first flange 114A. Oil seals 166 and 170 for preventing oil leakage are provided between the input shaft 116 and the motor coupling cover 150, and between the input shaft 116 and the second flange 114B, respectively. Accordingly, this reducer device 100 can share many parts and components with conventional reducers, for example, roller bearings 124A, 124B, and 124C, external gears 126A, 126B, and 126C, and others. According to the experiments conducted by the inventors of the present invention, a mere application of oil lubrication in a conventional reducer did not provide desired performance or product life. With this reducer device 100, however, the oil lubrication system is applicable with only minor changes in the design, and the improved lubrication provides longer life and higher efficiency.

The oil circulating holes 160 provided in the first flange 114A can connect the oil reservoir section 152 with the reduction gear part GS1. This enables smooth circulation of lubricating oil OL between the oil reservoir section 152 and the reduction gear part GS1, ensuring better lubrication.

Furthermore, the oil ports 158 provided in the motor coupling cover 150 connecting the oil reservoir section 152 with the outside of the motor coupling cover 150 enable easy maintenance as they allow the lubricating oil OL to be exchanged without disassembling the entire reducer 100.

The shape, structure and the like of the reducer device 100 of the invention should not be limited to the above-described exemplary embodiment.

Figure 5:
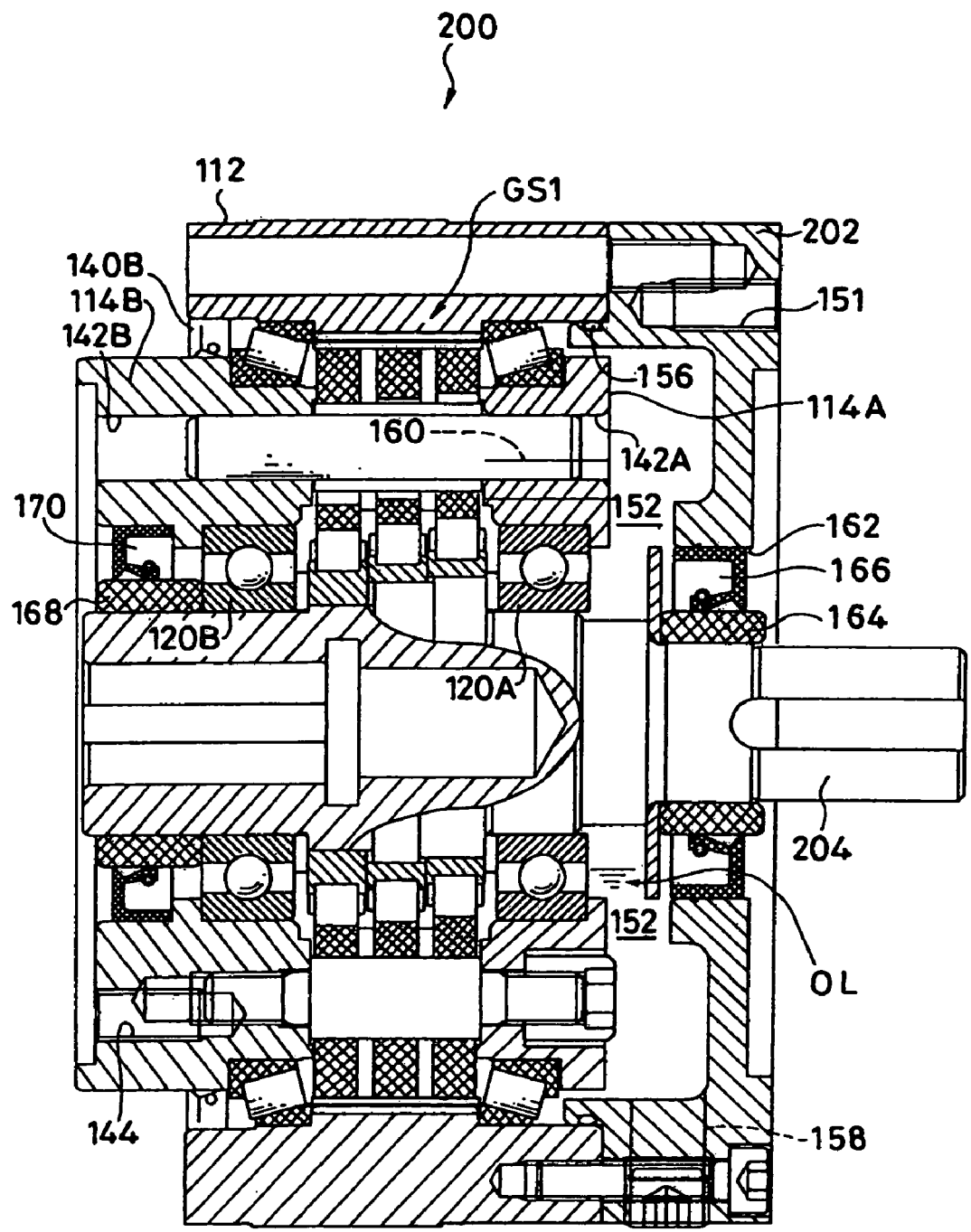
FIG. 5 is a cross-sectional view showing a device incorporating a reducer with internally meshing planetary gears according to another exemplary embodiment of the present invention.
Figure 6:
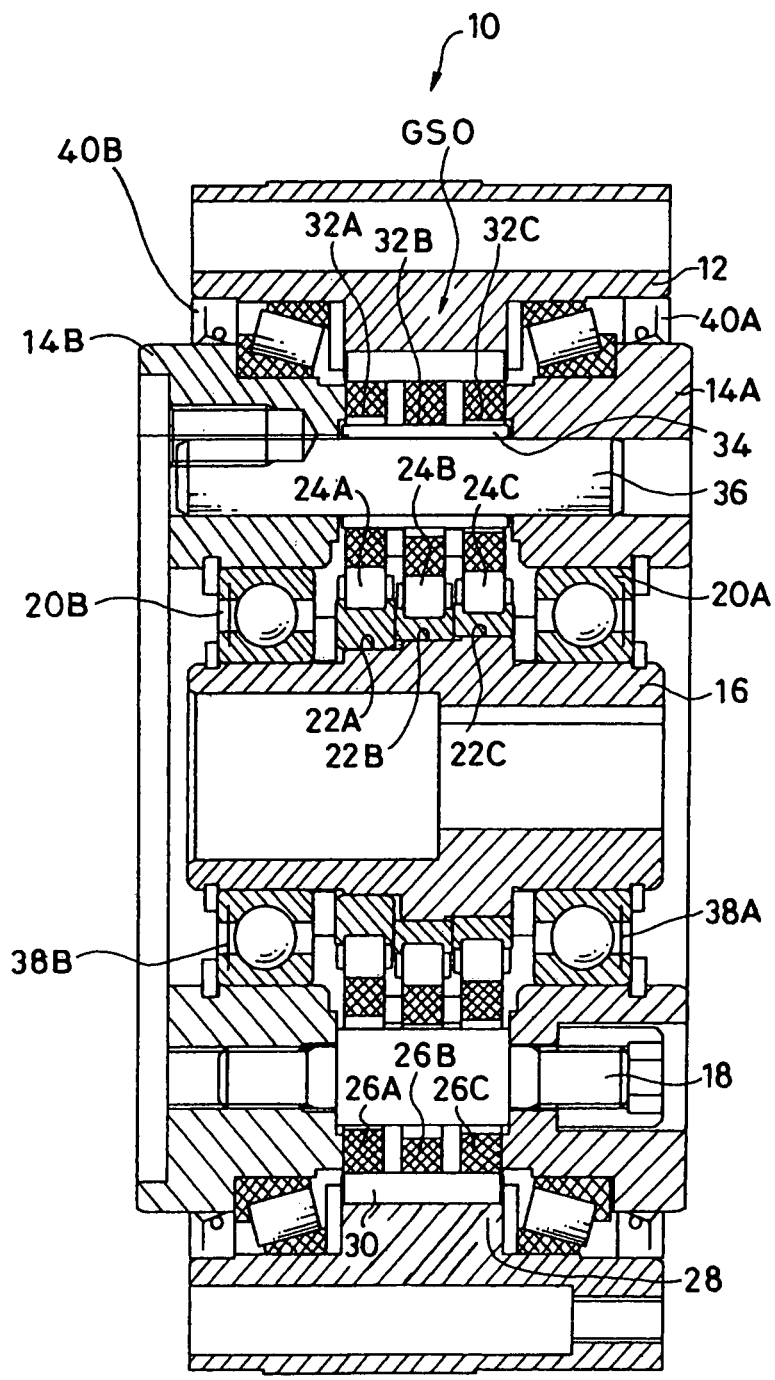
FIG. 6 is a cross-sectional view showing a conventional planetary gear reducer.

For example, as with a reducer device 200 shown in FIG. 5, a brake cover 202 for attaching a brake (not shown) may be used instead of the motor coupling cover 150 of the reducer device 100. In this case, the input shaft 204 can double as the brake shaft. Alternatively, an ordinary cover, which has no other functions as with the motor coupling cover 150 or brake cover 202, may also be used.

While the oil circulating holes 160 are provided in the first flange 114A in the above-described exemplary embodiment for the lubricating oil to travel therethrough, such oil circulating holes 160 may not necessarily be formed if the lubricating oil OL is circulated smoothly enough through clearances, for example, between the input shaft 116 and the bearing 120A or between the first flange 114A and the bearing 120A.

While the oil ports 158 are formed in the peripheral frame part of the motor coupling cover 150, such holes may be provided according to the needs, and the number should not be limited to three.

The present invention can be applied to the reducer with internally meshing planetary gears and the device incorporating the reducer used for driving a machine in a high-precision control system, such as a joint controller of industrial robots, an automatic tool exchanger, and the like.

The disclosure of Japanese Patent Application No. 2004-219209 filed Jul. 27, 2004 including specification, drawing and claim are incorporated herein by reference in its entirety.

What is claimed is:

1. A reducer with an internally meshing planetary gear mechanism, comprising:
   a first flange and a second flange arranged opposite each other inside a casing and rotatably supported in the casing;
   an internally meshing planetary reduction gear part arranged between the first and second flanges, the internally meshing planetary reduction gear part having an input shaft that is supported rotatably on respective sides by the first and second flanges;
   a cover, through which the input shaft extends, arranged on the first flange on the opposite side from the internally meshing planetary reduction gear part;
   an oil reservoir section formed between the cover and the first flange; and
   oil seals provided between the input shaft and the cover and between the input shaft and the second flange, respectively.

2. The reducer with an internally meshing planetary gear mechanism according to claim 1, wherein
   the first flange is formed with an oil circulating hole in addition to a hole for the input shaft of the first flange so that the oil reservoir section communicates with the internally meshing planetary reduction gear part.

3. The reducer with an internally meshing planetary gear mechanism according to claim 1, wherein
   the cover is formed with an oil port which connects the oil reservoir section with the outside of the cover.

4. A device incorporating a reducer with an internally meshing planetary gear mechanism, comprising:
   a first flange and a second flange arranged opposite each other inside a casing and rotatably supported in the casing;
   an internally meshing planetary reduction gear part arranged between the first and second flanges, the internally meshing planetary reduction gear part having an input shaft that is supported rotatably on respective sides by the first and second flanges;
   a cover, through which the input shaft extends, arranged on the first flange on the opposite side from the internally meshing planetary reduction gear part, the cover having a function of cover of a motor to be connected to the reducer;
   an oil reservoir section formed between the cover and the first flange; and
   oil seals provided between the input shaft and the cover and between the input shaft and the second flange, respectively.

5. A device incorporating a reducer with an internally meshing planetary gear mechanism, comprising:
   a first flange and a second flange arranged opposite each other inside a casing and rotatably supported in the casing;
   an internally meshing planetary reduction gear part arranged between the first and second flanges, the internally meshing planetary reduction gear part having an input shaft that is supported rotatably on respective sides by the first and second flanges;
   a cover, through which the input shaft extends, arranged on the first flange on the opposite side from the internally meshing planetary reduction gear part, the cover having a function of cover of a brake to be connected to the reducer;
   an oil reservoir section formed between the cover and the first flange; and
   oil seals provided between the input shaft and the cover and between the input shaft and the second flange, respectively.

* * * * *

UNITED STATES PATENT AND TRADEMARK OFFICE
CERTIFICATE OF CORRECTION

PATENT NO.        : 7,390,277 B2
APPLICATION NO.   : 11/185895
DATED             : June 24, 2008
INVENTOR(S)       : Masanori Egawa It is certified that error appears in the above-identified patent and that said Letters Patent is hereby corrected as shown below:

On the Title Page of the item (73) the Assignee should read:

--SUMITOMO HEAVY INDUSTRIES, LTD., Tokyo (JP)--

Signed and Sealed this

Twenty-seventh Day of January, 2009

JOHN DOLL
*Acting Director of the United States Patent and Trademark Office*